United States Patent [19]

Hildebolt

[11] 4,168,657
[45] Sep. 25, 1979

[54] PROTEIN TEXTURIZATION BY STEAM INJECTION

[75] Inventor: William M. Hildebolt, Mickelton, N.J.

[73] Assignee: Campbell Soup Company, Camden, N.J.

[21] Appl. No.: 794,814

[22] Filed: May 9, 1977

Related U.S. Application Data

[62] Division of Ser. No. 645,612, Dec. 31, 1975, Pat. No. 4,038,431.

[51] Int. Cl.² .............................................. A23J 3/00
[52] U.S. Cl. ...................................... 99/483; 99/536; 425/380
[58] Field of Search .......................... 99/348, 352–355, 99/450.1, 483, 516, 534, 536; 426/507, 511, 656, 802; 425/4, 6, 7, 72 R, 308, 310, 324.1, 326.1, 381, 380; 264/202

[56] References Cited

U.S. PATENT DOCUMENTS

| | | | |
|---|---|---|---|
| 3,754,926 | 8/1973 | Strommer | 426/511 |
| 3,794,731 | 2/1974 | Dannert | 426/802 |
| 3,914,455 | 10/1975 | Valentas | 426/457 |

*Primary Examiner*—Harvey C. Hornsby
*Assistant Examiner*—Timothy F. Simone
*Attorney, Agent, or Firm*—Schuyler, Birch, Swindler, McKie and Beckett

[57] ABSTRACT

A bland protein product having a texture and mouth feel simulating animal meat is prepared by forming an aqueous slurry containing 40 to 50% of a protein material having a protein content of at least 70% on a solids basis, injecting steam into the slurry to propel it through a cooking tube, passing the protein material through a back pressure valve at the discharge end of the cooking tube, and recovering the textured product in a collection zone. The injection steam pressure is chosen to maintain a product temperature of 310° to 350° F. and a back pressure of about 60 to 80 psi in the cooking tube. Between the back pressure valve and the collection zone the protein material is subjected to an agglomeration and stretching treatment accomplished by passing the protein and steam mixture through a restriction means, or by injecting a stream of cold water at right angles into the cooked protein and steam mixture, or by both of these steps. Apparatus for performing this process is also disclosed.

4 Claims, 2 Drawing Figures

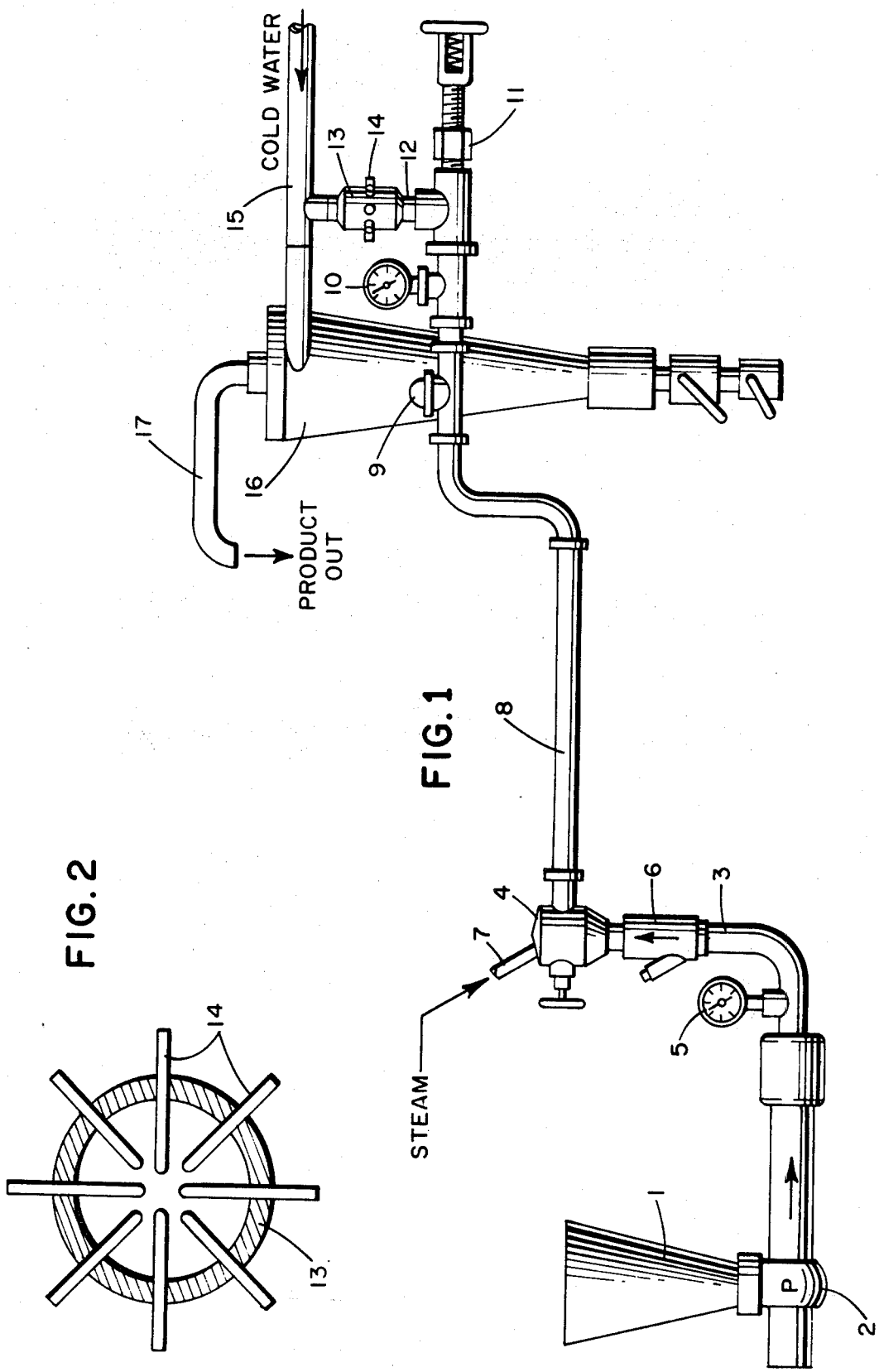

PROTEIN TEXTURIZATION BY STEAM INJECTION

This is a division of application Ser. No. 645,612, filed Dec. 31, 1975, U.S. Pat. No. 4,038,431.

BACKGROUND OF THE INVENTION

1. Field of the Invention

This invention relates to the treatment of untextured protein materials to form a product possessing the fibrous texture and mouth feel properties of animal meat.

2. Description of the Prior Art

The food industry has spent much effort over a span of many years and has expended large sums of money in an attempt to utilize non-meat proteins, such as those derived from vegetables, as additives to or substitutes for animal meat products. It long has been recongized that the ever-increasing worldwide food shortage could be in material part obviated if only such relatively inexpensive materials could be converted into products so closely approximating the naturally occurring food material that public acceptance would be achieved. One of the major roadblocks encountered by the industry has been the inability to impart the natural and accustomed chewy, fibrous texture to vegetable protein materials. Animal meat products inherently possess a texture giving them a definite "mouth feel" which is clearly recognized and strongly preferred. Vegetable proteins in their natural state generally take the form of amorphous powders which, despite their unquestioned nutritive value, possess mouth feel characteristics wholly unacceptable to the consumer as a meat substitute. Moreover, vegetable proteins normally are characterized by objectionable "beany" flavors which the industry has been unable to remove or mask.

In recent years a number of processes and apparatus have been developed for treating vegetable protein material to produce a bland texturized product. None of these processes, however, has achieved any substantive measure of commercial success.

The first generation of these prior art techniques involved the wet spinning process disclosed in Boyer, U.S. Pat. No. 2,730,447. This process produces a fibrous product by extruding a plurality of fine streams of an aqueous solution of protein into a chemical coagulating bath. The protein coagulates into fine fibers which are collected together and treated to form an edible textured protein product. The wet spinning process suffers from a number of drawbacks in addition to its general failure to produce an adequately textured product as discussed above. The equipment employed to perform this process is extremely sophisticated for the food industry and represents a very high initial cost problem. Adding further to the economic infeasibility of the product produced by the wet spinning process is the expensive starting materials which must be employed. Moreover, product uniformity is difficult to achieve due to the general complexity of the process and the numerous parameter control problems presented.

The second generation technique advanced in this area is the extrusion cooking process disclosed in Atkinson, U.S. Pat. No. 3,488,770, in which a protein mass is physically worked at an elevated temperature and thereafter extruded at an elevated temperature and pressure through an orifice into a medium of lower pressure and temperature. This process also suffers from high equipment costs. In addition, the product produced by extrusion cooking has a very low density which swells up in water to give a "spongy" texture. Moreover, the product contains objectionable flavor notes in addition to the "beany" flavor originally present in the starting materials which are apparently imparted to the product by the processing steps.

The third generation of development in the protein texturization involves the use of steam as the texturizing medium. Exemplary of this approach are Strommer, U.S. Pat. Nos. 3,754,926 and 3,863,019 which treat either finely divided protein particles or slurries with steam and Heusdens U.S. Pat. No. Re. 28,091 which employs a steam treatment of a protein slurry following complex hydration steps. Products produced by these processes also possess the general problems of poor texture and flavor discussed above. In addition, the product has low density problems similar to the second generation extrusion cooked products in that upon addition of water they swell and tend to be very soft. The dried product is also extremely friable.

Other attempted solutions by the art include the cooking and shaping of a protein dough disclosed in McAnelly, U.S. Pat. No. 3,142,571, and the heat coagulation of undenatured protein disclosed in Rusoff, U.S. Pat. No. Re. 27,790.

Notwithstanding the veritable plethora of prior art attempts to satisfactorily texturize vegetable proteins—no one to date has made any really substantial progress toward the desired goal. The present absence from the market of any commercially accepted consumer products based on vegetable protein demonstrates clearly that the problems involved simply have not been solved. Indeed, those meat analog products which have found their way to the supermarket shelves generally have been met with little or no consumer acceptance and have generally been withdrawn. Especially in the United States, where consumer preferences rather than nutritional values often dictate the fate of food products, a successful texturized vegetable protein material simply must possess taste and mouth feel characteristics similar to natural meat. In addition, the prior art processes generally have employed such complex apparatus and procedures that initial equipment and operating costs have made protein analog products economically unattractive to manufacturers, despite the relatively inexpensive nature of the raw product.

Given the ever-increasing fears of worldwide famine and the diminishing availability of animal meat protein products, it is clear that an inexpensive, consumer-acceptable, high protein food product based on texturized vegetable proteins is urgently needed.

BRIEF SUMMARY OF THE INVENTION

It is the general object of the present invention to provide a process and apparatus for texturizing protein which fulfills the need left unsatisfied by texturizing processes disclosed in the prior art.

More specifically, it is an object of the present invention to provide a process and apparatus for producing, from vegetable sources, a fibrous texture and mouth feel closely simulating that of natural meat.

It is a further object of the present invention to provide a process and apparatus which will produce a bland flavored protein product, thus obviating consumer rejection based on the natural flavor of vegetable protein substitutes.

Yet another object of the present invention is to provide a process and apparatus which will produce a retort stable protein product.

It is also an object of this invention to provide a texturizing process and apparatus which will produce a high quality product at a much lower cost due to lower equipment and operating costs.

Generally described, the method of the present invention comprises mixing untextured protein material and water to form a slurry, said protein material containing at least 70% protein on a dry weight basis, said slurry containing about 40 to 50% solids; injecting a heated gas flow into said slurry to propel the protein material into and through a confined treating zone, the temperature in said confined zone being maintained in the range of about 310° to 350° F., whereby said protein material is rendered to a thermoplastic state; passing the mixture of gas and thermoplastic protein material through a back pressure maintaining means disposed at the discharge end of said confined zone, said back pressure maintaining means maintaining a pressure of from about 60 to about 80 psi in said confined zone; subjecting the thermoplastic protein material issuing from said back pressure maintaining means to a stretching treatment; and recovering the texturized protein product in a collection zone.

The present invention further comprises apparatus for texturizing protein which comprises means for mixing a source of protein and water to form a slurry; means for advancing said slurry to an injection zone; means for injecting a gas flow into said slurry in said injection zone; means defining a confined treating zone communicating with said injection zone, whereby said gas flow propels said slurry into and through said confined treating zone; means positioned at the discharge from said confined treating zone for maintaining a predetermined back pressure in said confined treating zone, said back pressure maintaining means also defining an outlet for said protein material; means for stretching said protein material after it issues from said back pressure maintaining means; and means for recovering said protein material in a collection zone.

BRIEF SUMMARY OF THE DRAWINGS

FIG. 1 is a schematic of the protein texturizing apparatus of the present invention.

FIG. 2 is a sectional view taken along line 2—2 showing the details of one embodiment of the restriction means of the present invention.

DETAILED DESCRIPTION OF THE INVENTION

The present invention is directed to a process and apparatus for texturizing protein material. The term texturizing as used herein and widely understood in the art refers to the process of changing globular, amorphous particles of protein into fibrous continuous phase protein material with structural integrity.

The term retort stable as used herein refers to a product which keeps its structural integrity after treatment as elevated temperature and pressure. In the typical retort processing test about 1 part texturized protein is mixed with 10 parts of a 1% salt solution and sealed in a can. The can then is placed in a retort and subjected to a temperature of 250° F. and a pressure of 15 psig for about 60 minutes. The ability of a retorted product to maintain its structural integrity and bite characteristics can be tested by placing the product between the thumb and forefinger and subjecting the product to shear forces. A retort stable product will not disintegrate with moderate finger pressure. A product with poor retort stability will feel mushy and will fall apart when subjected to moderate shear forces.

The protein material employed in the process of the present invention must contain at least 70% protein on a solids basis to achieve a product possessing the requisite texture and mouth feel. Of primary interest are vegetable protein materials derived from soybeans. The soy protein can take the form of soy flour, soy concentrate, soy isolates, or mixtures thereof, which meet the minimum 70% protein requirement. In a preferred embodiment the protein material comprises a mixture of from about 50 to 60% soy flour and from about 40 to 50% soy isolate. Other oilseed materials such as peanut, cottonseed, and sesame seed also may be employed. Other known protein sources such as those derived from wheat, milk, eggs, single cell or leaf proteins and the like may be texturized according to the process of the present invention. The protein material employed should be viable; i.e., have a PDI (Protein Dispersability Index) in the range of from 50 to about 90%.

In accordance with the process of the present invention the protein material above described initially is mixed with water to form a dough-like proteinaceous slurry. This slurry should contain about 40 to 50% solids. If desired, a pumping aid such as, for example, sodium bisulfite, may be employed to reduce the viscosity of the slurry. The slurry is advanced to a steam injection zone by a feed pump. The slurry feed rate will depend on the capacities of the particular apparatus employed. In pilot plant size apparatus, rates of about 6 to 15 pounds per minute have been employed, whereas in production applications, rates of from about 20 up to 50 pounds per minute or more may be employed.

High pressure steam then is injected directly into the protein slurry in the injection zone. The high pressure steam insures rapid and uniform heat transfer to the protein slurry. The steam pressure should be sufficiently high to overcome the pressure of the slurry from the pump and to propel the slurry out of the steam injection zone. Pressures in the range of about 80 to about 150 psi have been found suitable to achieve this result. Best results are achieved when the steam injection pressure is in the range of about 110 to about 120 psi.

The high pressure steam flow leaving the injection zone propels the protein slurry into a confined treating zone. A predetermined elevated temperature and pressure are maintained in the treating zone to convert the protein to a thermoplastic state. The protein product should be held under pressure in the confined treating zone until a temperature of about 310° to 350° F. is reached. Best results are achieved at temperatures of about 325° to about 330° F. The residence time in the treating zone is not critical and may range from a few seconds up to one or two minutes. The residence time values may be controlled by varying the slurry feed rate and/or the length of the zone.

At the discharge end of the treating zone is a back pressure maintaining means. The back pressure means should allow the protein product to issue from the confined treating zone while maintaining a back pressure of up to about 100 psi at the discharge end of the treating zone. Preferably, back pressures of about 60 to 80 psi are employed.

After passing through the back pressure means the steam-protein mixture is subjected to an additional texturizing step or steps before ultimate recovery in the collection zone.

One additional texturizing step in accordance with a preferred embodiment of the invention comprises passing the steam and protein mixture through a conduit containing a restriction means which projects into the flow path. The restriction means permits substantially unhampered fluid flow but the solid protein material is temporarily caught and agglomerated on the projections and is stretched by the passing fluid flow in the conduit.

Another texturizing step and further embodiment of the invention comprises passing the mixture of steam and protein material issuing from the back pressure means through a conduit and injecting at least one stream of cold water at right angles into the flow in the conduit. The cold water stream or streams condenses the steam still present in the mixture and sets up the protein material. Moreover, the shear forces resulting from the right angle water injection further stretch the protein. Cold water injection rates of from about 20 grams per minute up to about 60 grams per minute or more may be employed depending on the form of the final product desired. At cold water injection rates on the order of 20 gpm and 1 foot per second the fibrous product tends to be formed in chunks. Doubling that rate reduces the chunkiness and increases the hair-like, matted character of the product. Tripling the flow rate to about 60 gpm produces exceptionally fine fibers in a very matted form. Further increases in the water flow rate tend to produce fibrils and fragmented fibers.

Either or both of the above described additional texturizing steps may be performed after the protein leaves the back pressure means. If both of these additional steps are practiced, preferably the effluent from the confined treating zone first should be passed through the restriction means and then into the cold water injection zone.

The final step of the process of the present invention is product recovery. The recovery step can be performed in any suitable collection zone in the known manner and will be characterized by enhanced characteristics.

One embodiment of the apparatus of the present invention now will be described by reference to FIG. 1. Water and protein to be texturized are mixed in a suitable mixing apparatus 1, such as a Hobart bowl mixer equipped with pastry hooks. Discharge from the mixing means is forwarded by a feeding means 2 through a feed line 3 having a steam injection zone 4. The feeding means can be any device capable of advancing a relatively high consistency slurry. Positive displacement pumps such as the "Moyno" pump are well suited for this application. Another suitable pump is the "Monark Shovel," a piston type transfer pump sold by Graco, Inc. of W. Caldwell, N.J. The feed line contains a pressure gauge 5 and a check valve 6 to prevent back flow in the feed line.

Steam injection zone 4 comprises a mixing valve assembly in which the protein slurry from the feed line and high pressure steam are mixed. Any valve assembly can be employed which effects a rapid and intimate mixture of steam and protein without clogging. One suitable valve is the Schutte & Koerting Model #320, 1¼" NPT. Steam enters the injection zone via inlet line 7. The injection zone is in communication with a confined treatment zone 8. In the preferred embodiment the treatment zone comprises an elongated cylindrical chamber or "cooking tube." The dimensions of this chamber are not critical. The cooking tube should be long enough to achieve good fluidization of the protein and to achieve good heat transfer from the steam whereby the protein is rendered thermoplastic. In practice, lengths of from 7 to 13 feet have been satisfactorily employed. The diameter should be large enough to prevent clogging and small enough to facilitate the maintenance of proper pressure conditions with available steam. Diameters in the range of about 1½ to about 6 inches have been found to satisfy these conditions although a maximum of 3 inches is preferred. The cooking chamber may be provided with temperature sensing element 9, and a discharge pressure gauge 10. The discharge end of the chamber is provided with a back pressure maintaining means 11. This back pressure means can comprise a valve or other mechanism which allows the product to escape from the cooking tube while maintaining an adequate back pressure in the tube. Suitable back pressure means include a spring loaded valve, or a rotary air lock type valve. One such back pressure valve is the Model #D60R THMP Triclover Triclamp, a spring loaded back pressure valve.

In the preferred embodiment shown in FIG. 1, a conduit 12 communicates with the exit port of the back pressure valve 11. This conduit contains a restriction means 13, best seen in FIG. 2, which projects into the flow path of the conduit, but allows substantially unhampered fluid flow therethrough.

The restriction means 13 can have any configuration which will allow substantially unhampered fluid flow while still providing sufficient arresting surface for protein agglomeration. Generally, restriction means having a plurality of radially inwardly extending projections are suitable to achieve these results and are preferred. The projecting surfaces 14 of the restriction means catch and agglomerate the solid protein material which then is stretched and oriented by the forces resulting from the passing fluid flow in the conduit.

Referring again to FIG. 1 and the preferred embodiment there shown, the conduit containing the restriction means further communicates with a cold water injection inlet 15. Preferably, this injection inlet is disposed at substantially right angles to the protein containing fluid flow in the conduit to provide maximum shear forces as the water proceeds into the conduit. Injection angles other than 90° are also suitable where generation of lower shear forces may be desired to impart stretching to the protein material. Irrespective of the angle and amount of shear forces, the cold water injection condenses the remaining steam in the cooking tube effluent.

The product and water mixture is forwarded to a collection zone 16 having a product discharge line 17. The collection zone can be any means suitable for product recovery and may vary in design. For example, a liquid cyclone may be employed. Other suitable recovery apparatus includes a pipe flume conveyor to a Sweco 30" screen or a Dorr Oliver hydro screen.

The product produced by employing the process parameters and apparatus of the present invention comprises a fibrous texturized protein material having structural and eating properties similar to animal meat products. Observance of the process parameters of the invention results in a product exhibiting a laminated fibrous striated muscle-like structure which is generally oriented in one direction. In between the laminated layers, the product of the present invention exhibits excellent cross fiber development. This structure is generally more dense than the prior art products and has a system of small voids uniformly distributed throughout the protein matrix. This novel structure serves to provide a large number of natural shear points which give way upon chewing to provide bite and mouth feel characteristics which simulate natural meat products. Furthermore, the product is free from objectionable flavor notes which in themselves often made prior art products unacceptable to humans. Another advantage achieved by the process and apparatus of the present invention lies in the retort stability of the product. The protein product formed in accordance with this invention may be processed by conventional food preparation techniques without thermal degradation of its physical or organoleptic properties.

Products produced by the process of the present invention find utility in a number of food processing fields. Unlike the prior art products presently on the market, one form of the product produced according to the present invention consists of large diceable chunks of protein material having good internal fibrous structure. The prior art products generally comprise small fibrous protein materials which must be further processed before diced portions can be obtained. The products of the present invention can be diced as produced and incorporated directly into canned or frozen foods. The fibrous textured protein materials of the present invention also may be combined with suitable binders and adjuvants to provide meat analogs having the appearance, taste, and chewability of animal meat products. The product of the present invention may also be ground and employed as a filler or extender in ground meat products. It is also possible to produce fabricated nutrients from the protein material produced according to the present invention.

The following specific examples are intended to illustrate more fully the nature of the present invention without acting as a limitation on its scope.

EXAMPLE 1

A dry protein starting material is formulated to include one part of "Promine R" (a soy protein isolate containing 90% protein produced by Central Soya, Inc.), and one part 200W Soy Flakes (a soy flour containing 50% protein also produced by Central Soya, Inc.). 8,000 grams of this protein blend is mixed with 33 pounds of water containing 30 g of sodium bisulfite to provide a slurry containing slightly less than about 60% by weight of water and is texturized in the apparatus shown in FIG. 1.

The slurry is formed in a Hobart bowl mixer equipped with pastry hooks. The slurry is fed to the steam injection zone by a Model 3L-4 Moyno pump operated at 36 RPM. Steam injection is effected in a Schutte & Koerting Model #320 1¼" NPT mixing valve employing a steam pressure of about 100 psi. In this apparatus, the resulting steam velocity is in the range of about 50' per second. The steam serves to propel the protein through the cooking tube which is 10 feet long and 1½ inches in diameter. The back pressure at the exit port is held between 60 and 75 psi with a Model #D60R THMP Triclover Triclamp back pressure valve. The resulting steam/protein mixture is subjected to additional texturization by a radial restriction means of the type shown in FIG. 2 having 8 projecting rods of 0.125" diameter and by a ¾ inch cold water injection line. The textured protein product then is recovered in a 1½ inch liquid cyclone separator. The resulting product has a firm fibrous texture simulating animal meat.

EXAMPLE 2

This example demonstrates the applicability of the present invention to protein material other than soy protein. In two separate tests a portion of the soy protein material is replaced with non-soy protein materials. The solids formulations are as follows:

| I | |
|---|---|
| Promine R | 4000 g |
| Egg White | 4000 g |
| Sodium Bisulfite | 30 g |

| II | |
|---|---|
| Promine R | 900 g |
| Cottonseed Flour | 500 g |
| Sodium Bisulfite | 4 g |

Each of these dry protein materials is slurried and treated as in Example 1 except that only one additional texturizing step (cold water injection) is employed. The products produced exhibit good textural properties.

While certain specific embodiments of the invention have been described with particularity, it should be recognized that various modifications will occur to those skilled in the art. Therefore, the invention is to be limited solely by the scope of the appended claims.

I claim:
1. Apparatus for texturizing protein material comprising:
    (a) means for mixing a source of protein and water to form a slurry;
    (b) means for advancing said slurry to an injection zone;
    (c) means for injecting a gas flow into said slurry in said injection zone;
    (d) means defining a confined treating zone communicating with said injection zone, whereby said gas flow propels said slurry into and through said confined treating zone;
    (e) means positioned at the discharge from said confined treating zone for maintaining a predetermined back pressure in said confined treating zone;
    (f) a conduit communicating with said back pressure maintaining means;
    (g) means disposed in said conduit for stretching said protein material after it issues from said back pressure maintaining means, said means for stretching comprising a restriction means projecting into and dividing the flow path in said conduit to catch the protein material and to cause said material to be agglomerated on said restriction means and stretched by the passing gas flow in said conduit; and
    (h) means positioned at the discharge from said conduit for recovering said protein material in a collection zone.

2. The apparatus of claim 1 wherein said restriction means comprises a plurality of inwardly projecting radially disposed members.

3. Apparatus for texturizing protein material comprising
    (a) means for mixing a source of protein water to form a slurry;
    (b) means for advancing said slurry to an injection zone;

(c) means for injecting a gas flow into said slurry in said injection zone;

(d) means defining a confined treating zone communicating with said injection zone, whereby said gas flow propels said slurry into and through said confined treating zone;

(e) means positioned at the discharge end from said confined treating zone for maintaining a predetermined back pressure in said confined treating zone;

(f) a conduit communicating with said back pressure maintaining means;

(g) means disposed in said conduit for stretching said protein material after it passes from said back pressure maintaining means, said means for stretching comprising cold water injection means communicating at right angles with said conduit; and (h) means positioned at the discharge end of said conduit for recovering said protein material in a collection zone.

4. Apparatus for texturizing protein material comprising (a) means for mixing a source of protein water to form a slurry;

(b) means for advancing said slurry to an injection zone;

(c) means for injecting a gas flow into said slurry in said injection zone;

(d) means defining a confined treating zone communicating with said injection zone, whereby said gas flow propels said slurry into and through said confined treating zone;

(e) means positioned at the discharge end from said confined treating zone for maintaining a predetermined back pressure in said confined treating zone;

(f) a conduit communicating with said back pressure maintaining means;

(g) means disposed in said conduit for stretching said protein material after it issues from said back pressure maintaining means, said means for stretching comprising a restriction means projecting into the flow path in said conduit to catch the protein material and to cause said material to be agglomerated on said restriction means and stretched by the passing gas flow in said conduit;

(h) cold water injection means communicating at right angles with said conduit and disposed downstream from said restriction means; and (i) means positioned at the discharge end from said conduit for recovering said protein material in a collection zone.

* * * * *